United States Patent [19]
Philibert et al.

[11] 3,880,453
[45] Apr. 29, 1975

[54] PROCESS FOR SEALING CABLE AT FITTINGS

[75] Inventors: Robert A. Philibert, Burlington, Conn.; Robert F. Polimine, Lynbrook, N.Y.

[73] Assignee: General Signal Corporation, Rochester, N.Y.

[22] Filed: Sept. 6, 1973

[21] Appl. No.: 394,909

[52] U.S. Cl. ............... 285/161; 29/460; 174/65 G; 174/153 G; 403/267; 403/268
[51] Int. Cl. ............................................ H02g 15/00
[58] Field of Search ......... 285/161, 162; 174/65 G, 174/153 G, 152 G; 403/268, 267, 266, 269; 29/460

[56] References Cited
UNITED STATES PATENTS

| | | | |
|---|---|---|---|
| 3,052,748 | 9/1962 | Curtiss | 285/161 X |
| 3,127,471 | 3/1964 | Greiner | 285/161 X |
| 3,667,783 | 6/1972 | Sofolongo | 285/161 |
| 3,672,712 | 6/1972 | Davis | 403/268 |

FOREIGN PATENTS OR APPLICATIONS

| | | | |
|---|---|---|---|
| 156,642 | 10/1956 | Sweden | 285/161 |

*Primary Examiner*—Thomas F. Callaghan
*Attorney, Agent, or Firm*—Milton E. Kleinman; John Ohlandt; Harold S. Wynn

[57] ABSTRACT

A technique and apparatus for sealing a variety of cable such as control and power cables into a fitting, such as a nipple assembly, or, circular chamber.

10 Claims, 2 Drawing Figures

3,880,453

PROCESS FOR SEALING CABLE AT FITTINGS

BACKGROUND, OBJECTS AND SUMMARY OF THE INVENTION

The present invention relates to the connection of groups of cables to a pressurized environment and more particularly to a technique, and apparatus associated therewith, for sealing a variety of cables at a console or similar point of connection to a pressurized environment.

In a number of different situations it becomes necessary to insure that there is pressure sealing of a room in which large numbers of cable conductors are to be distributed. One example of an environment in which the need exists to maintain pressurization is a nuclear power plant control room. In order to insure pressurization, resort is often had to specialized fittings for this purpose. However, it is extremely difficult and burdensome for the person in charge of the detailed design of the electrical interconnections to take into account the requirements on each and every cable or conductor that goes into the environment in relation to the problem of providing for pressure sealing of such environment. In particular, it is especially difficult and expensive to keep track of the variety of sizes, including deviation from standard sizes, so as to insure proper sealing of each cable.

Accordingly, it is a primary object of the present invention to provide a process, and apparatus utilized therewith, that permits pulling of the cable, involving a variety of cables of different types and sizes, into an environment that requires pressurization, and sealing groups of cables at their respective fittings only after all of the cable conductors have been appropriately connected to the equipment within the pressurized environment. This affords great convenience in the making of connections within a pressurized environment. Moreover it becomes a simple matter to replace a sealed group of cables with other cables of entirely different types and sizes because the sealing compound employed has such characteristics that it may be easily broken away.

The fitting or bushing embodying the principles of the present invention not only accepts the ordinary cables, but is designed in such a way that it will accept cables that have computer connectors. Such computer connectors are preassembled, i.e. they are connected to the cable at the factory because this expedient entails a much smaller expense than connection at the site. However, in the case of most fittings that are used in conjunction with cables for pressure sealing purposes, the preassembly would be unavailing since the cable must be threaded through the fittings. This necessarily involves removing the connector from the cable end, and, since most computer cables have a multitude of conductors, the reconnection of the conductors to the connector would be extremely expensive.

It will be appreciated from the description which follows that the technique of the present invention permits such computer connectors to be passed through the sealing fitting without the need to disconnect the many cable conductors.

A further advantage of the technique of the present invention is that when the cables have been sealed to prevent loss of pressure, there is also produced an effective fire and smoke stop. It will be understood, of course, that most of the cables that run into a pressurized control room are housed in cable trays located underneath the room. Many times fires occur in these cable trays and it is important that the fire or smoke from the fire does not enter the room so as to force the operators to leave the room, thus abandoning their critical duties.

Accordingly, it will be appreciated that further and more specific objects of the invention are to enable the extensive pulling and connection of a variety of cables in an efficient and time-saving manner; and to insure efficient sealing of the variety of cables so as to avoid pressure loss and to prevent entry of fire or smoke into the sealed environment.

The above objects are fulfilled by a feature of the present invention which resides in a technique for sealing a variety of cables subsequent to the installation of the cables within the environment. The technique comprises installing a nipple assembly or assemblies at the bottom of a console located within the control room, suitable untapped holes, sometimes called "knockouts," being provided in such consoles. A given nipple assembly consists of a male nipple, gasket and lock nut. A locking collar is slipped over a given group or bundle of cables and the cables are pulled through the nipple assembly. A sealing assembly is spread open and placed around the cable group. Then, the sealing assembly is raised into the nipple assembly and the locking collar is tightened securely to the nipple assembly. The variety of cables in each group is pulled through its nipple assembly and appropriate connections are made to the equipment within the control room. After the cables in a group have been installed a split phenolic tube is placed around the group so as to surround all of the cables. The two pieces of the split tube are then taped together and a coated fiber sheet is attached to the lower portion of the tube. A putty material is inserted between the cables at a predetermined location below the fitting. The tube is then inserted into the sealing assembly and the bottom of the sheet is pulled together with a suitable typing device at the location of the putty material so as to form a dam. The sealing assembly is tightened so that it provides a good seal with the tube and also with the inside of the nipple assembly. A fluid sealing compound is poured into the tube and attached sheet.

Other objects, features and advantages of the present invention will be appreciated by reference to the following description taken in conjunction with the accompanying drawing.

PREFERRED EMBODIMENT OF THE INVENTION

Figure 1:
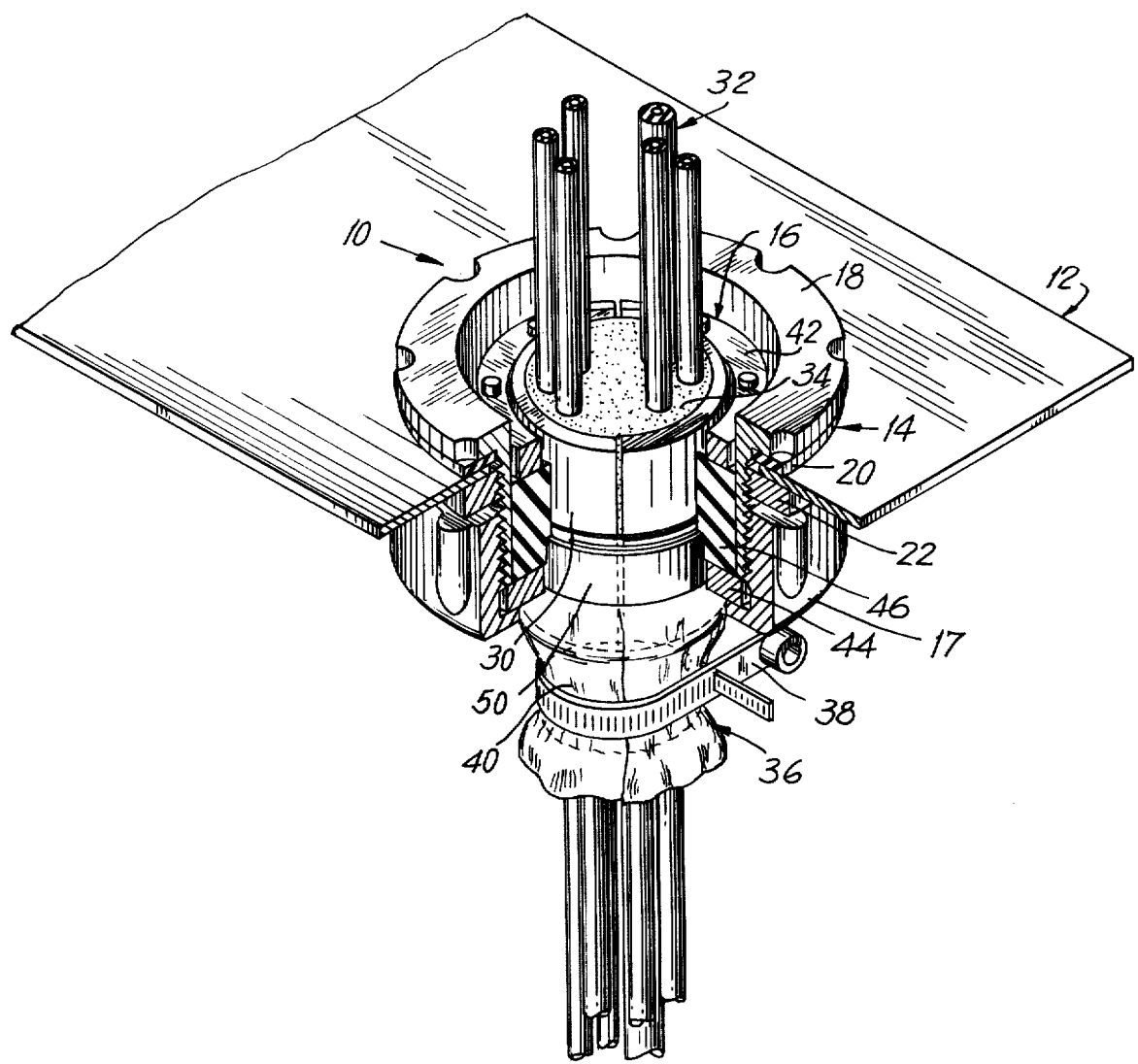
FIG. 1 is a perspective view, partly in section of the assembled sealed fitting of the present invention and particularly illustrating completion of the technique in accordance with the present invention.

Referring now to the drawing and for the moment to FIG. 1 thereof, there will be seen a fitting 10 which has been assembled in sealed relationship with a console 12, the bottom wall of which is seen in the figure. The sealed fitting 10 comprises a nipple assembly 14, a sealing assembly 16, and a locking collar 17. The nipple assembly 14 includes a nipple 18, gasket 20 and a lock nut 22.

Within the opening in the sealing assembly 16 there will be seen a tube 30 which consists of two pieces that have been taped together. Inside the tube 30 and surrounding a group of cables 32 is a polyseal compound 34. This material, which has the property of shrinking to a very limited degree as it solidifies, is prevented from escaping the tube by reason of the sleeve 36 comprising a coated fiber sheet that has been taped to the lower portion of the tube 30, being tied near its lower edge by the tie device 38. A suitable putty material 40 is seen to be retained at the lower part of the container 36.

Figure 2:
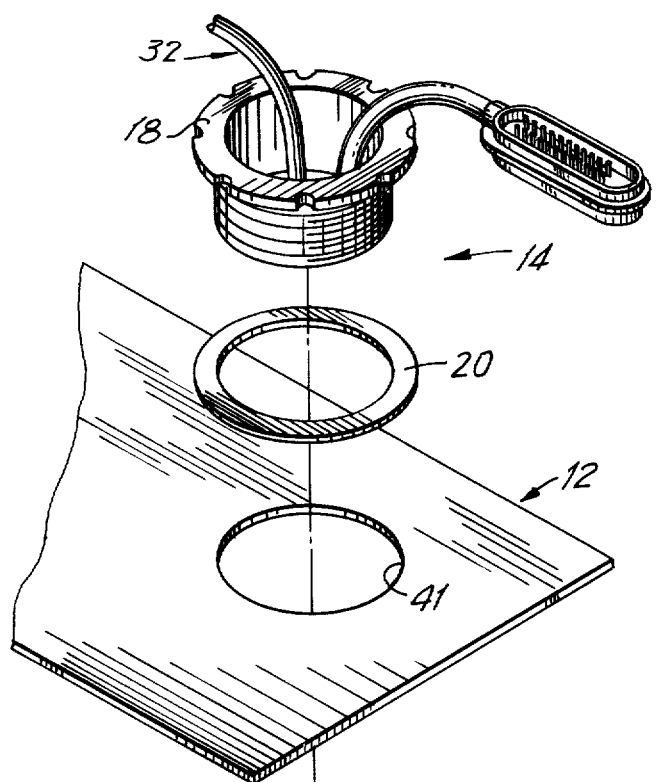
FIG. 2 is an exploded perspective view illustrating the steps performed in the technique of the present invention.
Figure 2:
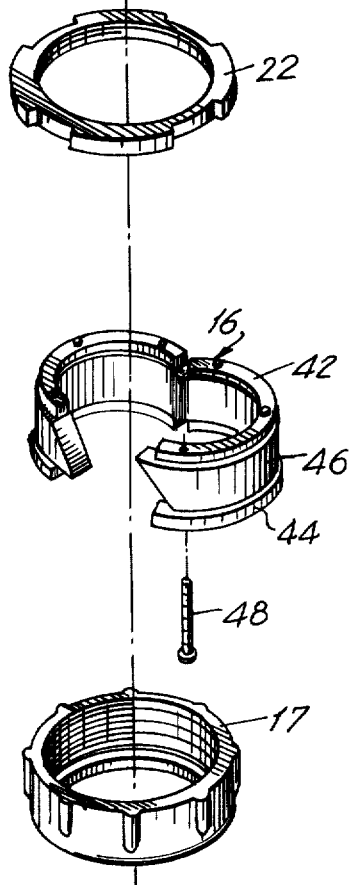
Figure 2:
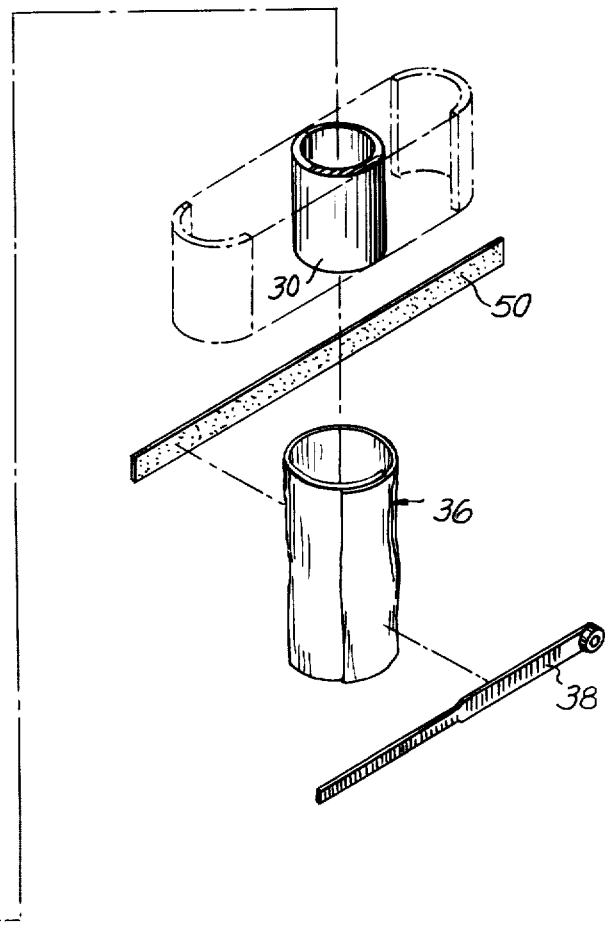

Referring now to FIG. 2, the various steps in the process according to the present invention will be appreciated. Thus, in the initial stage of installing the cables to a pressurized control room or the like, a typical opening 41 for the cables is established in the console 12 within the pressurized room. Before bringing about the sealing of the cables, the male nipple 18, gasket 20 and locking nut 22 are installed, the locking nut being placed on the outer side or underside of the console and engaged with the threads on the nipple 18. Also, at this time, the locking collar 17 is engaged with the threads on the nipple.

When it comes time to connect the group of cables 32, the cables are pulled through the already assembled nipple assembly and locking collar. After all of the cables have been pulled and their inner ends, that is, the ends within the pressurized environment, have been appropriately connected to the particular equipment, not shown, the sealing technique of the present invention is implemented. Thus, the appropriate components are put in place and the polyseal compound that will produce a pressure seal for all the cables within the opening is poured into the fitting.

First of all, the sealing assembly 16, which in its detailed structure includes a pair of spaced metallic rings 42 and 44, is placed about the group of cables 32. It will be noted that the upper ring 42 and the lower ring 44 are split at two substantially diametrically opposite points. A neoprene sealing ring 46 is disposed between the two split rings 42 and 44, the ring 46 being provided with a plurality of apertures extending axially and spaced around the circumference of the sealing ring 46 so that a set of screws 48, which are first pushed through clearance holes in the lower ring 44, can be extended through these apertures and into threaded holes in the upper ring 42. Tightening of the screws 48 results in insuring a proper seal at the inner and outer surfaces of the fitting abutting the ring 46.

The sealing assembly 16 is now pushed upward into the nipple assembly 14. Because of the particular construction of sealing assembly 16, the upper ring 42, which is of smaller diameter, can pass through the opening in the nipple assembly. However, the lower ring has a greater diameter such that it engages with the lower edge of the nipple 18. Following the positioning of the sealing assembly, the locking collar is moved up and tightened securely on the nipple 18.

Thereafter, the split phenolic tube 30, which as shown by the phantom lines, is in two sections, is assembled over the cable 32. A layer of tape 50, seen below the tube 30 in FIG. 2, is wrapped around the tube sections. Now the coated fiber sheet 36 is wrapped around the tube 30 so as to form a sleeve or container for the sealing compound that is to be used. The sheet is wrapped around and taped to the tube, the upper end of the sheet being secured somewhere near the midpoint in the axial length of the tube 30, below the area of the tube where the sealing assembly makes contact with the tube. A sealing putty 40 is placed at a location several inches below the fitting, being inserted between and around all of the cables 32 to a depth of about an inch or so.

The tube 30 with the attached sleeve 36 is now moved up into the sealing assembly. The tube is moved up sufficiently so that it is approximately flush with the top surface of the upper ring 42 of the sealing assembly. The several screws 48 are now completely tightened by the use of an Allen wrench. This insures that there will be a tight seal inwardly, that is, between the tube 30 and the inner surface of the neoprene ring 46, and outwardly as well between the outer surface of ring 46 and the inner surface of nipple assembly 14. It will be noted that the tie device 38 has been placed around the sheet at this point. By use of the tie device or wrap 38 the sleeve 36 is secured to the sealing putty 40, thus forming a dam or stop to prevent downflow of the polyseal compound 34 (FIG. 1).

The interior of the fitting, that is, the interior of the tube and the attached sleeve 36 is filled with a polyseal compound. It has been found that a number of thermosetting polyurethane resins can be utilized; however, a polyurethane sealing compound known as NOR-CAST 1090 which may be obtained from the R. H. Carlson Co., Inc., Greenwich, Conn., is preferred for the purposes of the present invention. This material has the extremely desirable property that it does not shrink significantly, i.e., it does not shrink more than ½percent, when fully cured. This compound is obtained from the manufacturer in two parts which are mixed together at the time of desired application for sealing purposes. It should be noted that its cure time is approximately 24 hours. It should further be noted that once the constituents have been mixed, the compound will be fluid for the purpose of pouring for a period of 30 minutes at 75° F, 45 minutes at 40° F, and 15 minutes 95°90° F.

While there has been shown and described what is considered at present to be the preferred embodiment of the several features of the present invention, it will be appreciated by those skilled in the art that modifications of such features may be made. Accordingly, it is desired that the invention not be limited to this embodiment, and it is intended to cover in the appended claims all such modifications as fall within the true spirit and scope of the invention.

What is claimed is:

1. A process for sealing cable at fittings connected to a pressurized environment or the like, comprising the steps of:

securing the fitting to a console or the like which is in communication with said environment;

pulling a group of cables through said fitting and connecting said cables within said environment;

placing a split ring sealing assembly around said cable group and moving said assembly inside said fitting;

assembling a split tube around the cable group;

attaching a sleeve or container to one end of the tube;

forming a dam between and around all of the cables;

disposing the tube, with the attached sleeve, within the sealing assembly such that the sleeve surrounds the dam; and, filling the tube with a fluid sealing compound.

2. A process as defined in claim 1, in which the step of pulling the group of cables is performed after the fitting has been secured.

3. A process as defined in claim 2 further including the step of positioning a plurality of screws within spaced apertures in the sealing assembly and
    tightening such screws to insure a good seal.

4. A process as defined in claim 3 further including the step of applying sealing putty around the cables, and
    extending a securing means around said sleeve at the point where said sealing putty has been disposed so as to form the dam and thereby prevent downflow of the sealing compound.

5. A process as defined in claim 1, in which said sealing compound is a polyurethane resin.

6. Apparatus for providing sealing of an opening in a console or the like through which a group of cables extend into a pressurized environment or the like, comprising:
    a nipple assembly adapted to surround said group of cables and adapted to be connected to said console or the like;
    a sealing assembly, including a pair of axially spaced rings and a resilient sealing ring extending between said axially spaced rings, all of said rings being split so that said sealing assembly is adapted to be placed around an already extended group of cables and to be positioned inside said nipple assembly;
    a sealing-compound-retaining means comprising a tube in two sections, adapted to be placed around said group of cables and thence to be disposed within said sealing assembly and to be engaged by the resilient sealing ring, and a sleeve attached to said tube and extending below the lower end of said tube;
    a sealing compound contained within said tube and retained by said tube and attached sleeve so as to surround said group of cables and to provide sealing of said environment.

7. Apparatus as defined in claim 6, in which said nipple assembly includes a nipple and a locking nut, said nipple being adapted to extend through said opening in the console, said nipple being provided with a flange for engaging one side of the console at the opening thereof and said locking nut being adapted to engage the opposite side thereof;
    and further comprising a locking collar secured to said nipple and having an inwardly extending flange engaging one of said split rings.

8. Apparatus as defined in claim 6 in which each of said axially spaced rings is split in two places and said sealing ring is split at a place substantially corresponding with one of the two places;
    and further including circumferentially spaced, aligned apertures in each of the split rings and the sealing ring for receiving screws.

9. Apparatus as defined in claim 6, in which said sealing compound is a polyurethane resin.

10. Apparatus as defined in claim 6, in which the upper one of said pair of axially spaced rings has a diameter smaller than the lower one such that the entire sealing assembly can pass into the opening in said nipple except for the lower ring which is stopped at the end of the nipple.

* * * * *